United States Patent [19]
Walden

[11] 3,919,564

[45] Nov. 11, 1975

[54] CHARGE TRANSFER LOGIC GATE

[75] Inventor: Robert Henry Walden, Warren, N.J.

[73] Assignee: Bell Telephone Laboratories, Incorporated, Murray Hill, N.J.

[22] Filed: May 16, 1974

[21] Appl. No.: 470,546

[52] U.S. Cl. ............ 307/218; 307/221 D; 307/304; 357/24

[51] Int. Cl.²..........H01L 27/10, H01L 29/78, H03K 19/08; H03k 19/22

[58] Field of Search ....... 307/213, 218, 221 D, 304; 357/24

[56] References Cited

UNITED STATES PATENTS 3,777,186 12/1973 Chang.................................. 357/24

3,789,267 1/1974 Krambeck et al. ................... 357/24

OTHER PUBLICATIONS

Sequin, "Blooming Suppression...", Bell System Technical Journal, Oct. 1972, pp. 1923–1926.

Mok et al., "Logic Array Using Charge Transfer Devices", Electronics Letters, Vol. 8, No. 20, Oct. 5, 1972, pp. 495–496.

Tompsett, "A Simple Charge Regenerator...", 1971 International Solid-State Circuits Conference, ISSCC Digest of Technical Papers, pp. 160–161.

*Primary Examiner*—William D. Larkins
*Attorney, Agent, or Firm*—M. J. Urbano

[57] ABSTRACT

A charge transfer logic gate comprises a plurality $n$ of one-bit shift registers which fan-in to the series combination of a logic cell and an output cell. Each shift register comprises the series combination of two subcells, each of area A. The subcells are separated from one another, and from the logic cell, by potential barriers of magnitude $V_B$ established illustratively by ion implantation. The areas of the logic and output cells are both $n\times$ A and the two are separated by a threshold potential barrier of magnitude $V_T$. To detect the presence of $m$ of $n$ inputs applied to separate ones of the shift registers ($2 \leq m \leq n$), the threshold barrier is preferably made to be $$V_T = \left(1 + \frac{m-1}{n}\right) V_B.$$

The subcells of each shift register, as well as the logic and output cells, are connected to suitable phases of a clock in order to perform a variety of logic functions such as AND and OR. When the inputs constitute continuous data streams, a dump gate is coupled to the logic cell to remove charge remaining therein after each logic operation is performed.

12 Claims, 3 Drawing Figures

CHARGE TRANSFER LOGIC GATE

CROSS REFERENCE TO RELATED APPLICATIONS

This application was concurrently filed with both application Ser. No. 470,550 (R. H. Walden 8) entitled "Charge Transfer Binary Counter" now abandoned, and application Ser. No. 470,511 (R. H. Walden 9) entitled "Charge Transfer Delay Line Filters."

BACKGROUND OF THE INVENTION

This invention relates to charge transfer devices and more particularly to charge coupled devices (CCDs) for performing logic functions.

The recent emergence of charge coupled technology has brought with it the advent of shift register and memory devices now well known in the art. In order to fabricate complete systems, other circuit functions are frequently utilized. By way of illustration, such supplementary functions often include logical AND and OR, binary counting, and signal filtering. Advantageously, if all of the circuits performing the various functions of the system are charge coupled devices, the manufacture of the system is simplified. A pair of shift registers coupled to an AND gate, for example, could be fabricated on a single chip by well-known integrated circuit technology. Moreover, interface problems, such as impedance matching and loading due to stray capacitance, would be alleviated.

SUMMARY OF THE INVENTION

In accordance with an illustrative embodiment of the invention, a charge transfer logic gate comprises a charge storage medium in which stripes or immobile charge are used to define a plurality of charge storage cells. In particular a plurality $n$ of one-bit shift registers fan-in to the series combination of a logic cell and an output cell. Each shift register comprises the series combination of two subcells, each of area A. The subcells are separated from one another and from the logic cell by potential barriers of magnitude $V_B$. The areas of the logic and output cells are both $k \times A$ ($k < 1$) and the two are separated by a threshold potential barrier of magnitude $V_T$. In order to detect the presence of $m$ of the $n$ inputs applied to separate ones of the shift registers ($2 \leq m \leq n$), the threshold barrier is made to be larger than the subcell barriers, and when $k = n$ preferably satisfies the following relationship:

$$V_T = \left(1 + \frac{m - l}{n}\right) V_B. \qquad (1)$$

The subcells, as well as the logic and output cells, are connected to suitable phases of a clock in order to perform a variety of logic functions such as AND and OR. In another embodiment where the input to the logic gate is a continuous stream of data pulses, a dump gate is coupled to the logic cell to remove charge remaining therein after each logic operation is performed.

BRIEF DESCRIPTION OF THE DRAWINGS

The invention, together with its various features and advantages, can be easily understood from the following more detailed description taken in conjunction with the accompanying drawing, in which.

DETAILED DESCRIPTION

Figures 1, 2:
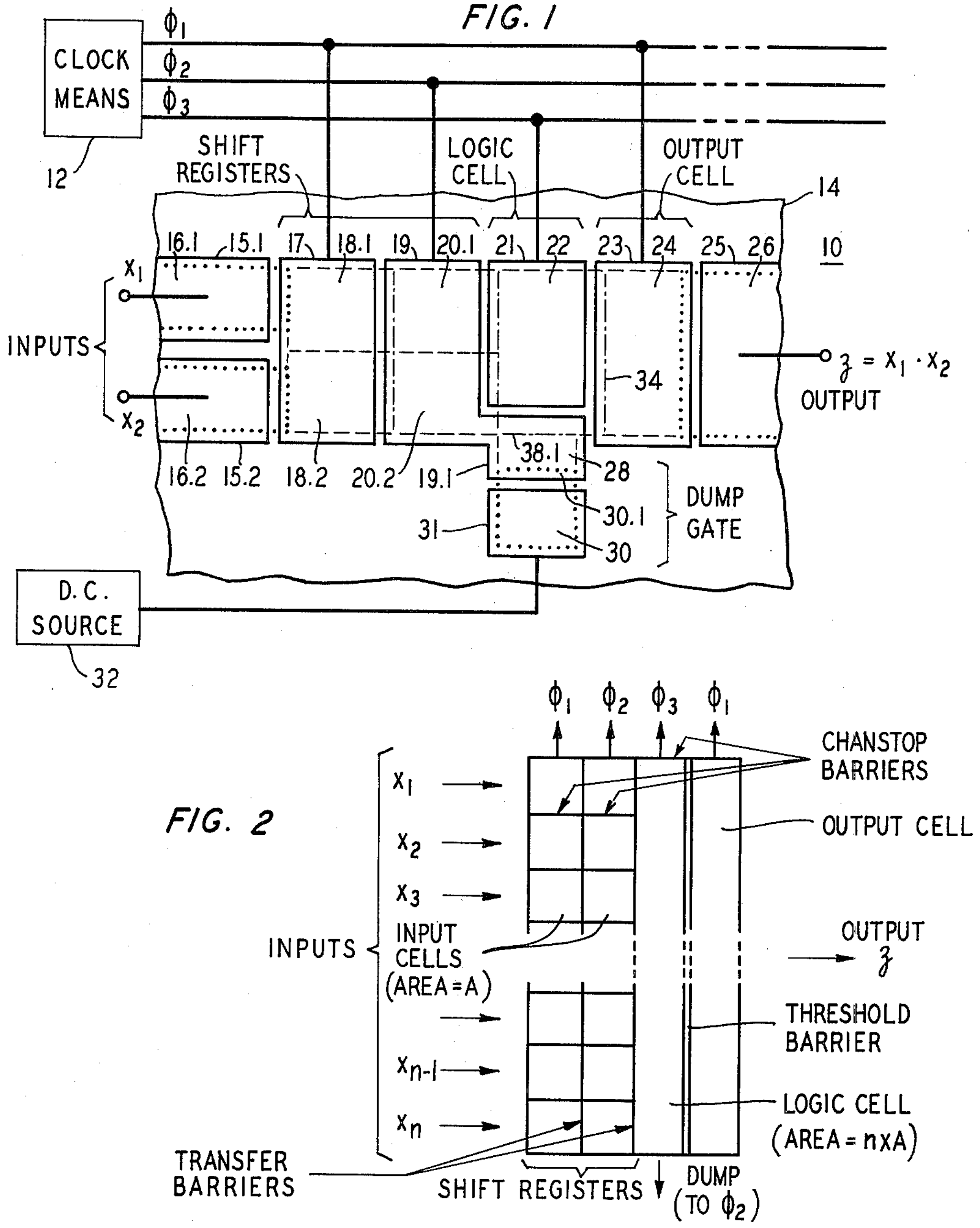
FIG. 1 is a plan view of a two-input AND gate in accordance with an illustrative embodiment of the invention.
FIG. 2 is a schematic plan view of a generalized logic gate in accordance with another illustrative embodiment of the invention.

Turning now to FIG. 1, there is shown a two-input AND gate comprising a CCD structure 10 electrically connected to three-phase clock means 12. The CCD structure comprises a storage medium 14, illustratively a $p^-$-type semiconductor substrate on which is formed a thin insulative layer (not shown), typically thermally grown silicon dioxide. The CCD structure 10 includes a plurality of CCD cells, each of which is defined by four stripes of charge imbedded in the semiconductor substrate. These stripes of charge, termed barriers, may be formed in the substrate by several known techniques including, for example, diffusion or ion implantation of localized portions of immobile charge (i.e., impurity centers) as taught in U.S. Pat. No. 3,789,267 (Krambeck Case 7–3) issued on Jan. 29, 1974. The barriers are arranged in a lattice to form rectangles although other two-dimensional shapes are within the scope of the invention (see FIG. 3). Overlaying the cells are a plurality of electrodes (solid lines) to be described hereinafter.

The inputs $x_1$ and $x_2$ are connected to the AND gate via suitable electrodes 15.1 and 15.2 which overlay a pair of $n^+$ diode diffusion zones 16.1 and 16.2, respectively, shown by dotted lines. As is well known in the art, holes (not shown) are cut in the oxide so that electrodes 15.1 and 15.2 contact the diffusion zones. Contact to other diodes described hereinafter is made in a similar fashion. Alternatively, the inputs $x_1$ and $x_2$ could be the outputs of preceding CCD devices, such as shift registers, in which case the $n^+$ diffusions would be omitted and standard CCD cells would be formed at 16.1 and 16.2. Each of the inputs $x_1$ and $x_2$ is coupled to separate one-bit shift registers: $x_1$ to the shift register formed by subcells 18.1 and 20.1, and $x_2$ to the shift register formed by subcells 18.2 and 20.2. The outputs of both shift registers fan-in to an adjacent CCD logic cell 22, the output of which in turn is coupled to a CCD output cell 24. Optionally, the charge accumulated in the output cell 24 is sensed by an output diode formed by another $n^+$ diffusion zone 26. Alternatively, where the output serves as the input to a succeeding CCD stage, the output diode can be omitted and a CCD cell can be substituted therefor. Also coupled to the logic cell 22 is a dump gate formed by the series combination of a CCD cell 28 and, adjacent thereto, another $n^+$ diode diffusion zone 30.

As mentioned previously, a metallization or electrode pattern (solid lines) overlays the barrier lattice. In particular, the input signals $x_1$ and $x_2$ are applied to electrodes 15.1 and 15.2, which overlay the diode diffusion zones 16.1 and 16.2, respectively. A single electrode 17 overlays the first subcell of each shift register; i.e., subcells 18.1 and 18.2, and is connected to phase $\phi_1$ of clock means 12. Similarly, electrode 19 overlays the second subcell of each shift register; i.e., subcells 20.1 and 20.2, and is connected to phase $\phi_2$ of clock means 12. Additionally, electrode 19 has an appendage 19.1 which overlays the CCD cell 28 of the dump gate. The diode diffusion zone 30 of the dump gate is connected through an electrode 31 to a d.c. source 32. An electrode 21 overlays the logic cell 22 and is connected to phase $\phi_3$ of clock means 12. The three clock phases are 120° apart. Similarly, electrode 23 overlays the output cell 24 but is connected, however, to phase $\phi_1$ of clock means 12. Thus the electrodes 21 and 23 (i.e., the logic and output cells) are seen to be connected to different clock phases, with the logic cell connected to a timewise later phase. Finally, electrode 25 overlays the optional output diffusion zone 26 and is connected to the output $z$ which, as described hereinafter, is the logical AND function of the inputs; i.e., $z = x_1 .x_2$ .

The barrier lattice is composed of stripes of charge with three different potential barrier heights: 1. All of the dashed lines represent chanstop barriers which are designed to prevent charge transport across them. The object of chanstop barriers, as described in U.S. Pat. No. 3,728,161 (R. A. Moline Case 8) issued on Apr. 17, 1973, is to eliminate spurious inversion of the surface of a semiconductor integrated circuit chip due to capacitive coupling between metallization and/or field oxide in the semiconductor substrate. If such coupling were strong enough to invert the surface of the semiconductor, current might leak between adjacent devices or might even short elements of a single device; 2. All of the dot-dashed lines are transfer barriers which have a height $V_B$ typical of an n-channel device; i.e., the application of the most positive clock voltage to the barrier region should permit complete transfer of charge. Note that the transfer barriers are asymmetrically positioned with respect to the center of each electrode in order to cause charge to flow in a predictable direction; i.e., from left to right (input to output) or top to bottom (logic cell to dump gate); and 3. The vertical dot-dashed line segment 34 represents a threshold barrier which has a height $V_T$ such that partial transfer of charge from the logic cell 22 to the output cell 24 occurs only when both inputs $x_1$ and $x_2$ have transferred full loads of charge into the logic cell 22 and a suitable clock voltage is applied to output cell electrode 23. In addition, the dotted lines represent the boundaries of diffusion zones.

The amount of charge that can be accepted in any of the subcells of the shift registers depends on the height of the potential barrier associated with the charge stripe and the area of the cell. As shown in FIG. 1, both the logic cell 22 and the output cell 24 have areas which are equal to twice that of the subcells of the shift registers. In order for the voltage associated with the transfer of charge out of the logic cell to be equivalent to that of any one of the shift register subcells (e.g., 18.1), the potential $V_T$ of threshold barrier 34 should have a height which is related to the transfer barrier potential $V_B$ as follows:

$$V_T = \left(1 + \frac{n-1}{n}\right) V_B \qquad (2)$$

where $n$ is the number of inputs $x_n$. This relationship assumes that the area of the logic cell is equal to the sum of the input subcell areas. In the case shown in FIG. 1 where $n = 2$, the threshold barrier potential should be 1.5 times the transfer barrier potential. A change in the relative areas of the subcells and the logic cell will change the relationship expressed by equation (2). In addition, it is preferable that the clock voltage swing be equal to the transfer barrier height $V_B$.

The AND gate of FIG. 1 operates as follows. During phase $\phi_1$ signal charge is transferred from one or both of the inputs $x_1$ and $x_2$ into the first subcells 18.1 and 18.2 of the shift registers. During phase $\phi_2$ any charge in the first subcells 18.1 and 18.2 is transferred into the second subcells 20.1 and 20.2. In addition, in preparation for transferring the charge in the second subcells into the logic cell 22, the dump gate is actuated in order to remove residual charge (from prior logic operations) from the logic cell 22. During phase $\phi_3$ any charge in the second subcells is transferred into the logic cell 22. During the next cycle, which corresponds to phase $\phi_1$ again, charge in the logic cell 22 will flow into the output cell 24 only if both of the inputs $x_1$ and $x_2$ have supplied charge initially. Thus, the output $z$ corresponds to a logical AND function; i.e., $z = x_1.x_2$.

It should be noted that, during the initial phase $\phi_1$ cycle when charge was being transferred into the first subcells 18.1 and 18.2, simultaneously the output cell 24 was being cleared of charge, if any, transferred thereto by prior AND operations. Of course, where the output is taken from a diode, as shown, the charge in the output cell 24 is automatically cleared. However, if the zone 26 is a CCD cell corresponding, for example, to the first stage of a succeeding CCD device, then the output cell 24 should be cleared prior to completion of the next AND operation. This clearing could be readily effected by connecting electrode 25 to phase $\phi_2$ of clock means 12.

Although the foregoing description of the AND gate of FIG. 1 utilized a three-phase clock in order to operate the dump gate prior to transferring charge into the logic cell 22, it is well within the skill of those in the art to utilize a two-phase clock with the first subcells and the logic cell connected to one phase and the second subcells and the output cell connected to the opposite phase. In this embodiment suitably delayed timing signals would be applied to the dump gate in order to clear the logic cell 22. Of course, the electrode 19 would be electrically isolated from its appendage 19.1; i.e., the two would be physically separated.

A generalized version of the invention is shown schematically in FIG. 2. For simplicity, however, the electrodes have been omitted and only the barrier lattice configuration of the underlying semiconductor substrate is depicted. In addition, lead lines from the clock means are shown drawn to the various CCD cells but, of course, it is to be understood that the connections are made to the electrodes not shown. As with the AND gate of FIG. 1, a single electrode (not shown) overlays all of the first subcells of the shift registers and is connected to phase $\phi_1$. Similarly, a single electrode (not shown) overlays all of the second subcells of the shift registers and is connected to phase $\phi_2$. The logic and output cell electrodes (not shown) are connected, respectively, to phase $\phi_3$ and phase $\phi_1$, and the dump gate electrode (not shown) is connected to phase $\phi_2$.

In this embodiment there are $n$ input signals designated $x_1, x_2. . .x_n$ coupled to separate ones of the first subcells of the $n$ shift registers. The height $V_T$ of the threshold potential barrier is such that an output $z$ is detected only if $m$ input signals deliver charge to the logic cell, where $m \leqslant n$. The threshold barrier, therefore, should be related to the transfer barrier $V_B$ according to the relationship $$V_T = \left(1 + \frac{m-1}{n}\right) V_B. \quad (3)$$

Equation (3) is identical to equation (1) and is repeated here for convenience. This configuration allows a variety of logic operations to be performed. For example, if $n = 3$ and $m = 2$, then when $x_3 = 0$, $z = x_1 \cdot x_2$ and the AND function is performed. On the other hand, when $x_3 = 1$, then $z = x_1 + x_2$ and the OR function is performed.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of my invention.

Figure 3:
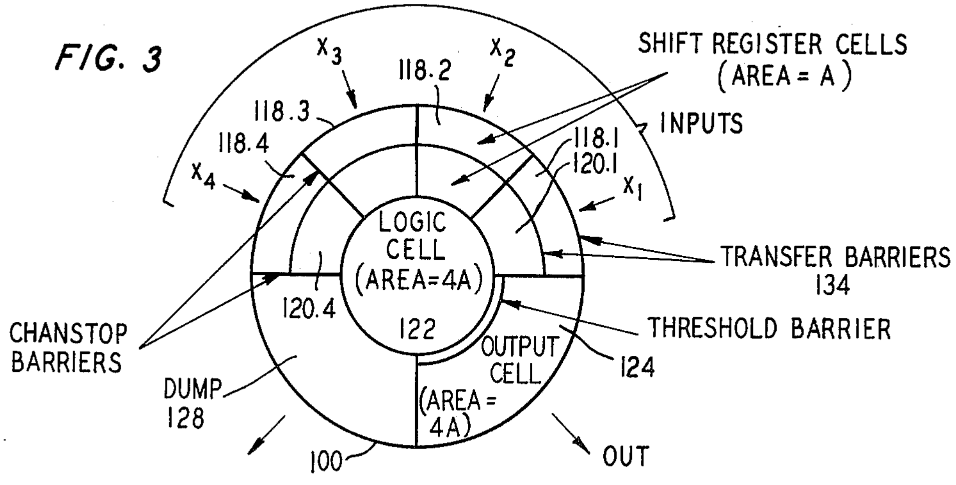
FIG. 3 is a schematic plan view of a four input, circular AND gate in accordance with a third embodiment of the invention.

As mentioned previously, the barrier lattice can be arranged to form not only rectangular cells but also other geometric shapes. In particular FIG. 3 shows schematically a four-input AND gate having a generally circular configuration. For simplicity and clarity of illustration, the electrodes have been omitted and only the barrier lattice configuration in the underlying semiconductor substrate has been shown. In this embodiment the depicted radial segments correspond to chanstop barriers whereas the circumferential segments, with the exception of threshold barrier 134, correspond to transfer barriers.

The logic cell 122 is defined by a circular zone at the center of the device. Surrounding the logic cell 122 are various shift register, dump and output cells having the general configuration of truncated sectors of a circle. Thus, the zone between the logic cell 122 and the circle 100 and between radii at 0° and 45° contains a one-bit shift register for receiving the input $x_1$. This shift register comprises the series combination of first and second subcells 118.1 and 120.1, respectively. Both of these subcells have the general configuration of truncated sectors of a circle. In a similar fashion the inputs $x_2$, $x_3$ and $x_4$ are connected to the AND gate through analogous shift registers, three of which are located in the zone between radii at 45° and 180°. In addition, in the zone between the logic cell 122 and the circle 100 and between radii of 180° and 270° there is located a truncated sector cell 128 corresponding to the dump gate. Finally, in the zone between the logic cell 122 and the circle 100 and between the radii at 270° and 360° there is located a truncated sector cell 124 corresponding to the output cell. The interface between the output cell 124 and the logic cell 122 is a circumferential segment 134 corresponding to the threshold barrier. In a preferred embodiment, each of the subcells of the shift register 118.1 to 118.4 and 120.1 to 120.4 has an area equal to A whereas the logic and output cells each have areas equal to 4A. For the configuration shown, a single annular semicircular electrode (not shown) overlays the first subcells 118.1 to 118.4 and a similarly shaped electrode (not shown) overlays the second subcells 120.1 to 120.4. Connections to suitable clock means and operation of the structure are substantially the same as that previously described with reference to FIGS. 1 and 2.

What is claimed is:

1. A charge transfer device for performing logic functions whenever $m$ of a possible $n$ input signals are applied to said device, where $2 \leq m \leq n$, said device comprising:

a charge storage medium, first electrode means for forming in said medium a plurality $n$ of one-bit shift registers, each of said shift registers comprising first and second subcells, each of said $m$ input signals being coupled to a separate one of said first subcells, and in each shift register the second subcell being adapted to receive charge transferred from the first subcell, second electrode means for forming in said medium a charge storage logic cell adapted to receive charge transferred from each of said second subcells, third electrode means for forming in said medium a charge storage output cell adapted to receive charge transferred from said logic cell, each of said subcells being of area A and said logic and output cells each being of area $k \times A$ ($k < 1$), as measured in a plane parallel to a major surface of said medium, first asymmetric potential well means for establishing in said medium first surface potential barriers of magnitude $V_B$ between said first and second subcells of each of said shift registers and between each of said second subcells and said logic cell, and second asymmetric potential well means for establishing in said medium and between said logic and output cells a second surface potential barrier of magnitude $V_T$ sufficiently greater than $V_B$ so that, when each of said first and second subcells and said logic and output cells are connected to suitable phases of a voltage clock, charge is caused to propagate in a direction from said first subcells to said output cell, said logic and output cells being connected to different phases of said clock, with said logic cell being connected to a timewise later phase, and the amplitude of the clock voltage in relation to $V_B$ and $V_T$ being effective to permit virtually complete transfer of charge across said barriers of magnitude $V_B$ and to permit only partial transfer of charge across said barrier of magnitude $V_T$ so that charge is transferred from said logic cell to said output cell only if $m$ input signals are applied to said device.

2. The device of claim 1 wherein the geometric configuration of said first and second subcells and said logic and output cells is defined by elongated segments of immobile charge imbedded in a surface layer of said medium.

3. The device of claim 2 wherein said segments forming the boundaries of said subcells and cells in a direction generally parallel to that of charge propagation are potential barriers which prevent the transfer of charge thereacross during normal operation.

4. The device of claim 3 wherein said segments forming the boundaries, including said first and second asymmetric potential well means, of said subcells and cells in a direction generally perpendicular to that of charge propagation are transfer potential barriers which allow the transfer of substantially all charge thereacross during normal operation.

5. The device of claim 4 wherein $k = n$ and said second surface potential barrier satisfies approximately the relationship: $V_T = 1 + m - 1/n\ V_B$.

6. The device of claim 4 wherein said device has a configuration defined by an outer circular transfer barrier, said logic cell forms a circular core within said outer barrier, said first and second subcells and said output cell have the shape of truncated sectors of a circle and are positioned radially between the circumference of said logic cell and said outer barrier, and radial boundary segments are potential barriers which prevent the transfer of charge thereacross during normal operation and circumferential boundary segments are transfer barriers.

7. The device of claim 6 including means for removing charge remaining in said logic cell after each logic operation is performed and before charge is again transferred from any one of said second subcells into said logic cell during the next succeeding logic operation, said removing means comprising a charge storage dump cell also having the shape of a truncated sector of a circle and being positioned radially between the circumference of said logic cell and said outer barrier.

8. The device of claim 1 including means for removing charge remaining in said logic cell after each logic operation is performed and before charge is again transferred from any one of said second subcells into said logic cell during the next succeeding logic operation.

9. The device of claim 8 including three phase clock means, said first subcells and said output cell being electrically coupled to a first phase of said clock means, said second subcells and said removing means being electrically coupled to a second phase of said clock means, and said logic cell being electrically coupled to a third phase of said clock means.

10. The device of claim 9 wherein said first electrode means comprises a first electrode overlaying said first subcells and connected to said first phase and a second electrode overlaying said second subcells and connected to said second phase, said removing means comprising a charge storage dump cell adjacent said logic cell along a boundary thereof which does not intersect said direction of charge propagation from said first subcells to said output cell, and said first asymmetric potential well means also establishes a barrier of magnitude $V_B$ between said logic and dump cells.

11. The device of claim 10 wherein said second electrode means includes an electrode appendage which overlays said dump cell.

12. The device of claim 11 including diode means adjacent said dump cell and effective upon the application of a suitable voltage thereto to receive charge transferred from said logic cell into said dump cell.

* * * * *

UNITED STATES PATENT AND TRADEMARK OFFICE

CERTIFICATE OF CORRECTION

PATENT NO. : 3,919,564

DATED : November 11, 1975

INVENTOR(S) : Robert H. Walden

It is certified that error appears in the above-identified patent and that said Letters Patent are hereby corrected as shown below:

Column 1, line 43, change "(k < 1)" to --(k > 1)--.

Column 6, line 23, change "(k < 1)" to --(k > 1)--.

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*